United States Patent Office 3,328,960
Patented July 4, 1967

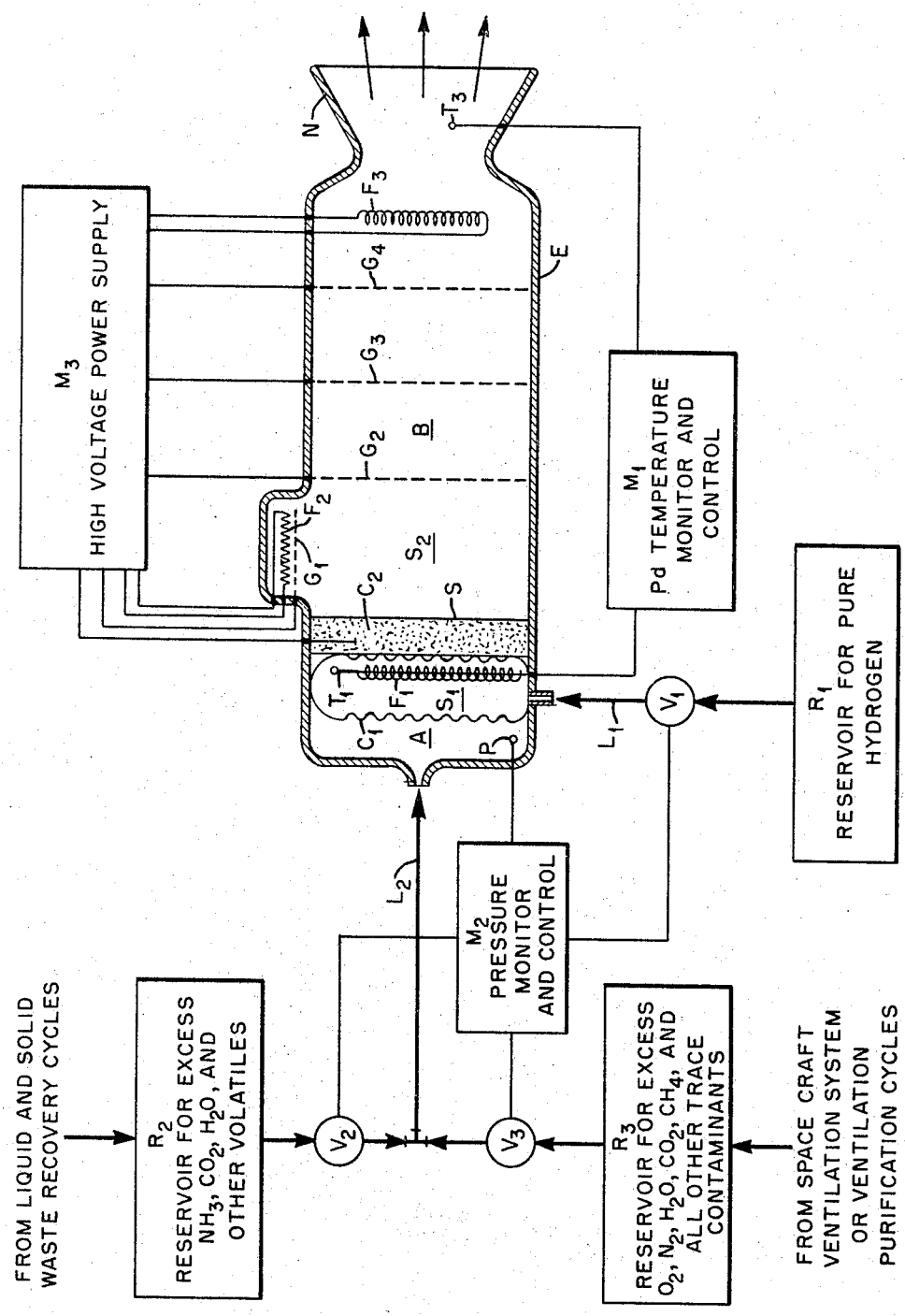

3,328,960
ION PROPULSION SYSTEM EMPLOYING LIFE-CYCLE WASTES AS A SOURCE OF IONIZABLE GAS
Thomas W. Martin, Nashville, Tenn., assignor to the United States of America as represented by the United States Atomic Energy Commission
Filed Aug. 16, 1965, Ser. No. 480,214
1 Claim. (Cl. 60—202)

ABSTRACT OF THE DISCLOSURE

An improved ion propulsion system of a spacecraft for human occupancy in which at least a portion of the ions are derived from life-cycle wastes of an occupant.

---

The present invention relates to and it is an object of this invention to provide a novel system for the production of ions and free radicals and their reaction and discharge from an electrostatically-charged palladium metal or alloy surface. It is a further object of this invention to employ such a system as an ion-thrustor for space propulsion. Another object of this invention is to provide an ion propulsion system capable of utilizing gases generated from life cycle wastes as a source of propellant gas.

The remarkable catalytic activity of palladium has been known for a long time and is based on the unusual affinity for palladium metal or alloys thereof to extract and absorb hydrogen atoms from hydrogen-containing substances. It is also known that a thin sheet of palladium can serve as an effective semi-permeable membrane through which molecular hydrogen will diffuse away from the side having the higher partial pressure. It is also known that the diffusion of hydrogen through a palladium membrane is a function of temperature.

I have found a remarkably new and unique way of employing a palladium membrane, sheet, tube, or sponge as a source of positive ions which, in combination with the aforementioned known qualities, provide a means and method for controlling the rate as well as the absolute amount of ions and free radicals produced at a palladium surface from an ionizable gas, particularly a hydrogen-containing gas.

In accordance with my invention an ionizable gas or a gaseous hydrogen-containing substance is caused to diffuse either over or through a surface of palladium or its alloys while said palladium is charged to a high positive potential, the magnitude of such potential depending on the particular diffusing gas. Under these conditions, it will be found that the charged palladium surface will serve as an abundant source of positive ions and/or free radicals. Thus, in accordance with my invention, I can utilize the well-known hydrogenating and dehydrogenating quality of palladium, as well as the temperature controlled diffusion quality of palladium membrane and sheet to create an ion and free radical source on a surface simply by imposing an electrostatic potential upon the palladium and exposing it to a flowing gas. The electrostatically-charged surface may now be used to make an efficient ion thrustor or to provide useful thrust in space environments.

The accompanying figure is a schematic illustration of this improved ion-thrustor employing a palladium catalyst assembly to make a new type of propulsion device that can be integrated with a life support cycle of a space vehicle designed for human or animal occupants. As shown in the drawing, the ion-thrustor comprises a primary source of pure hydrogen $R_1$, secondary sources of other gases $R_2$ and $R_3$, and an ion thrustor envelope E separated into two chambers, A and B.

The thrustor envelope E may be made of ceramic or ceramic coated metal or of metal provided that suitable connectors and insulators are used for introducing gases and electrical leads. Chamber A is defined by the walls of envelope E and by an electrostatically-charged porous, permeable membrane or diffuser $C_2$. Chamber A receives life cycle gases from reservoirs $R_2$ and $R_3$ via valves $V_2$ and $V_3$ and thence through line $L_2$. Within chamber A is an irregularly-shaped, thin-walled palladium thimble $C_1$ in contact with $C_2$. $C_1$ encloses a region $S_1$ which receives hydrogen from reservoir $R_1$ via valve $V_1$ and through line $L_1$. The flow rate of hydrogen diffusing the thimble walls is temperature regulated by a heater filament $F_1$ in region $S_1$. $F_1$ is regulated by a thermal sensor $T_1$ through a temperature monitor and control $M_1$. $C_1$, $C_2$, $F_1$, $T_1$, and $M_1$ all float at the same voltage. $M_1$, as shown, may also be used to monitor the temperature of gases issuing from nozzle N by a sensor $T_3$.

The flow rate of gas in chamber A is controlled by a pressure sensor P in said chamber through pressure and monitor control $M_2$. $M_2$ regulates inlet valves $V_2$ and $V_3$ as well as inlet valve $V_1$ at a desired feed rate to control the pressure head of gas in chamber A. $S_2$ is a region within chamber B, downstream of the charged diffuser membrane $C_2$ in which uncharged gaseous species issing from surface S of $C_2$ are ionized by a shower of electrons emitted by filament $F_2$, the extent of electron emission being controlled by a grid $G_1$. The opposite end of region $S_2$ is delimited by a palladium grid $G_2$ operated at a lower positive potential than ($C_1$, $C_2$).

It will be seen that a palladium catalyst mass is used in three components—$C_1$ and $C_2$ both floating at the same potential and a secondary palladium grid $G_2$ which acts in concert with $F_2$ and $G_1$ to generate additional positively charged species from neutral free radicals or molecules unionized by passage through ($C_1$, $C_2$). $C_1$ and $C_2$ are charged to a positive voltage high enough to generate ions at the surface S of membrane $C_2$. For hydrogen a potential of +1500 volts vs. ground chassis ($G_3$) will produce ions at S. The remaining electrical components are standard—$G_3$ is an accelerating grid set at chassis ground; $G_4$ is a decelerating grid set at a potential to inhibit neutralizing electrons from an electron emitting filament $F_3$ (set near the throat of nozzle N) from being accelerated toward the ion chamber $S_2$. All potentials applied and the power delivered to filaments $F_2$ and $F_3$ are obtained from high voltage power supply $M_3$. The only factors limiting the thrust developed by this thrustor is the power rating of $M_3$ and the rate of flow of gaseous propellant passing through $C_2$.

In order to generate the highest specific impulse, the palladium catalyst membrane is operated with pure hydrogen gas from $R_1$. The hydrogen in reservoir $R_1$ may consist of liquid hydrogen, presurized gaseous hydrogen, or may be in the form of an easily decomposable metallic hydride such as titanium hydride, lithium aluminum hydride, lithium borohydride, etc. It may also be obtained as a by-product in an oxygen recovery cycle used for life support by the electrolysis of waste or excess water.

Assume the system is operating at a set hydrogen pressure, with $C_1$ and $C_2$ charged to a positive potential $>+1500$ volts, $G_2$ at a somewhat less positive (about 1–25 volts); $G_3$, the accelerating grid at chassis ground; $G_4$ is set as indicated; and $F_2$ and $F_3$ are emitting electrons. Under these conditions, $H_2$ flows through valve $V_1$ and line $L_1$ into region $S_1$, diffuses into A and thence through $C_2$. $C_2$ acts to maintain a sizeable pressure differential between chambers A and B. It also insures a smooth diffusive flow of propellant gas.

The major formation of ions and free radicals is thought to take place as the hydrogen diffuses through $C_2$ to reach surface S. A further enhancement of positive ion yield takes place in region $S_2$ by the combined action of $F_2$ and $G_2$. $F_2$ emits a shower of electrons, the level of which is controlled by grid $G_1$ to cause ionization of neutral molecules and uncharged free radicals which have passed through $C_2$. Palladium grid $G_2$, set at a slightly less positive potential than ($C_1$, $C_2$) supplements the ion production contributed by $F_2$ and $C_2$. Additional electrostatically-charged grids to increase the efficiency of ion production may be used as desired. Finally, the ions passing downstream from $S_2$ through $G_2$ are accelerated by grid $G_3$ (at chassis ground) and are neutralized by means of $F_3$ as they pass out of the thrustor through nozzle N.

While the ion propulsion system just described has been shown to be operable with pure hydrogen gas, it can be operated efficiently utilizing off-gases derived from processing all human waste products generated in a space vehicle. Thus, reservoirs $R_2$ and $R_3$ are for the express purpose of utilizing any volatile material from life support or waste recovery systems as effective thrustor propellants. This is of importance to the safety and well-being of a spacecraft crew, and is to be contrasted with previously reported ion thrustors which use gaseous cesium and mercury as propellants where waste products generated from the life-cycle of the space crew cannot be used. Further, Cs and Hg are biologically dangerous materials whereas the various source materials used here are not. In the system described here, the palladium catalytic ion thrustor can be an integral and versatile part of the life support system in that useful propulsion energy can be extracted out of the waste and excess on-board materials in conjunction with or to supplement the primary propellant source gas. For example, liquid and solid waste can be electrolyzed to produce gaseous products to be stored in reservoir $R_2$. Similarly, the gaseous mixture of excess oxygen, nitrogen, water vapor, carbon dioxide, methane, and other trace gaseous contaminants taken from the spacecraft ventilation system is stored in reservoir $R_3$ and is allowed to flow into the thrustor through control valve $V_3$. The desired flow rate through $V_3$ is controlled and regulated in the same manner as $V_2$. This flow system is designed to be completely flexible so that the propellant materials stored in either $R_1$, $R_2$, or $R_3$ may be used separately or in combination to maintain the desired gas pressure in chamber A.

When using the propellant mixture from $R_2$ and $R_3$, the palladium catalyst assembly functions not only to form ions from the hydrogen-containing materials, but also catalyzes chemical reactions among the several propellant components producing free radicals or excited molecules which are easy to ionize by electron bombardment. These catalytic reactions release heat which can be used to raise the propellant temperature, adding an extra measure of thrust to the propellants. The fact that these chemical reactions takes place in the presence of the palladium catalyst also guards against possible explosive reactions of said mixture. For example, a propellant mixture that is oxygen-rich may react with hydrogen diffusing through the palladium to form water in a controlled combustion rather than in an explosive reaction since the rate of reaction is limited by the rate of diffusion and takes place entirely on the palladium surface.

While the invention has been described with reference to the use of palladium metal as the catalyst membrane or mass, it is within the scope of this invention to use palladium-containing alloys for the same purpose. Moreover, the metal or alloy can be used as the massive metal or in colloidal form in which case it may be packed as a compact or coated on a porous, permeable support structure.

Having thus described my invention, I claim:

In an ion propulsion system of a spacecraft for human occupancy and containing a reservoir for life-cycle wastes,
(a) a porous, permeable palladium membrane;
(b) a primary source of ionizable gas comprising hydrogen;
(c) an auxiliary source of ionizable gas comprising a gas produced from life-cycle wastes from an occupant;
(d) means for selectively feeding said primary gas and said auxiliary gas to and through said membrane in diffusive flow;
(e) means for charging said membrane to an electrical potential sufficient to generate ions, electrically neutral free radicals, and excited molecules on a surface of said membrane;
(f) means for establishing an electrical and pressure gradient to accelerate said ions and neutrals from said surface in a specific direction;
(g) supplementary electrostatic and electron-producing means for enhancing the ionization of said gases beyond that produced on said membrane; and
(h) means for neutralizing accelerated ions as they leave the system.

References Cited
UNITED STATES PATENTS

| | | | |
|---|---|---|---|
| 3,020,431 | 2/1962 | Martina | 60—202 |
| 3,157,988 | 11/1964 | Schultz | 60—202 |
| 3,177,654 | 4/1965 | Gradecak | 60—202 |
| 3,279,176 | 10/1966 | Boden | 60—202 |

OTHER REFERENCES

Nature, Feb. 28, 1959, volume 183, p. 573 relied on.

CARLTON R. COYLE, *Primary Examiner.*